United States Patent
Tseng

(10) Patent No.: US 8,400,999 B2
(45) Date of Patent: Mar. 19, 2013

(54) METHOD OF HANDLING PACKET DATA IN A WIRELESS COMMUNICATIONS SYSTEM AND RELATED APPARATUS

(75) Inventor: Li-Chih Tseng, Taipei (TW)

(73) Assignee: Innovative Sonic Limited, Port Louis (MU)

( * ) Notice: Subject to any disclaimer, the term of this patent is extended or adjusted under 35 U.S.C. 154(b) by 667 days.

(21) Appl. No.: 11/790,636

(22) Filed: Apr. 26, 2007

(65) Prior Publication Data

US 2007/0253393 A1    Nov. 1, 2007

Related U.S. Application Data

(60) Provisional application No. 60/745,748, filed on Apr. 27, 2006.

(51) Int. Cl.
*H04J 3/24* (2006.01)
(52) U.S. Cl. .......... 370/349; 455/414.1; 455/561.1; 455/88; 455/424; 455/562.1; 370/428; 370/235; 370/216; 714/748
(58) Field of Classification Search ........... 455/414.1, 455/561, 561.1, 411, 88, 424, 562.1; 370/428, 370/235, 216; 714/748
See application file for complete search history.

(56) References Cited

U.S. PATENT DOCUMENTS

| | | |
|---|---|---|
| 2003/0067907 A1 | 4/2003 | Rezaiifar |
| 2003/0099211 A1* | 5/2003 | Moulsley et al. ......... 370/328 |
| 2003/0147348 A1 | 8/2003 | Jiang |
| 2003/0235162 A1* | 12/2003 | Chao et al. ............... 370/329 |
| 2004/0037224 A1* | 2/2004 | Choi et al. ............... 370/235 |
| 2004/0223507 A1* | 11/2004 | Kuchibhotla et al. ........ 370/428 |
| 2006/0018259 A1* | 1/2006 | Kadous .................... 370/236 |
| 2006/0209783 A1* | 9/2006 | Jain et al. ................. 370/349 |
| 2007/0049278 A1* | 3/2007 | Lindoff et al. ............. 455/439 |
| 2007/0115894 A1* | 5/2007 | Herrmann et al. ........... 370/338 |
| 2007/0250751 A1* | 10/2007 | Cai et al. .................. 714/748 |

FOREIGN PATENT DOCUMENTS

| | | |
|---|---|---|
| JP | 2001237883 | 8/2001 |
| JP | 2005506735 A | 3/2005 |
| JP | 2006109270 | 4/2006 |
| KR | 10-2004-0029763 A | 4/2004 |
| KR | 10-2005-0122282 A | 12/2005 |
| WO | 2005/006640 A1 | 1/2005 |

OTHER PUBLICATIONS

3GPP TS 25.321 V7 .0.0 (Mar. 2006),"Medium Access Control (MAC) protocol specification (Release 7)".
Xie, Xiren, Title: Computer networks, Second Edition, Aug. 31, 2001, p. 51, Electronic Industry Press, Beijing, China.
Robert Bestak, Philippe Godlewski, "High Speed Downlink Packet Access (HSDPA) in WCDMA, (mode FDD)", May 25, 2005.
Office Action on corresponding foreign application (JP2007-114555) from JPO dated Jan. 4, 2012.

* cited by examiner

*Primary Examiner* — Kwasi Karikari
(74) *Attorney, Agent, or Firm* — Blue Capital Law Firm, P.C.

(57) ABSTRACT

A method of handling packets for a user end in a wireless communications system includes activating a hybrid automatic repeat request (HARQ) procedure, receiving a first packet and decoding the first packet successfully, receiving a second packet following the first packet, and decoding the second packet if the second packet is a retransmission of the first packet.

11 Claims, 5 Drawing Sheets

METHOD OF HANDLING PACKET DATA IN A WIRELESS COMMUNICATIONS SYSTEM AND RELATED APPARATUS

CROSS REFERENCE TO RELATED APPLICATIONS

This application claims the benefit of U.S. Provisional Application No. 60/745,748, filed on Apr. 27, 2006 and entitled "METHOD AND APPARATUS FOR HANDLING HARQ PROCESSES WITH THE SAME NDI", the contents of which are incorporated herein by reference.

BACKGROUND OF THE INVENTION

1. Field of the Invention

The present invention relates to a method and related communications device for handling packets, and more particularly, to a method and related communications device for handling packets in a hybrid automatic repeat request (HARQ) process for a user end in a wireless communications system.

2. Description of the Prior Art

The third generation (3G) mobile telecommunications system has adopted a Wideband Code Division Multiple Access (WCDMA) wireless air interface access method for a cellular network. WCDMA provides high frequency spectrum utilization, universal coverage, and high quality, high-speed multimedia data transmission. The WCDMA method also meets all kinds of QoS requirements simultaneously, providing diverse, flexible, two-way transmission services and better communication quality to reduce transmission interruption rates. Through the 3G mobile telecommunications system, a user can utilize a wireless communications device, such as a mobile phone, to realize real-time video communications, conference calls, real-time games, online music broadcasts, and email sending/receiving. However, these functions rely on fast, instantaneous transmission. Thus, targeting third generation mobile telecommunication technology, the prior art provides High Speed Downlink Package Access (HSDPA) and High Speed Uplink Package Access (HSUPA), which are used to increase bandwidth utility rate and package data processing efficiency to improve uplink/downlink transmission rate.

In the prior art, HSDPA and HSUPA adopt Hybrid Automatic Repeat Request (HARQ) technology to enhance retransmission rate and reduce transmission delay. HARQ is a technology combining Feed-forward Error Correction (FEC) and ARQ methods, which triggers retransmission according to positive/negative acknowledgement signals (ACK/NACK) transmitted from a receiving end, and stores useful information about the last failed transmission for later use. During retransmission, the HARQ process uses the same transport block size as that used in the previous transmission, thus the retransmitted transport block has the same amount of bits. However, modulation type, channelization code set, and transmission power utilized may be different for the two transmissions. In order to minimize the number of retransmission requests, HARQ uses one of two Soft-Combining methods, namely Chase Combining (CC) and Incremental Redundancy (IR), to ensure that messages can be successfully decoded. CC transmits a packet the same as the erroneous packet, and the decoder combines all the received packets before performing decoding. IR increases redundancy to help in recovery from transmission errors, sequentially transmitting packets having parts of the erroneous packet, and the decoder combines the packets.

Through an HARQ process in HSDPA, the user equipment (UE) receives packet data units (PDUs) from a network end (UTRAN) and feeds back an ACK or a NACK according to a result of processing the PDUs. In general, the UE stores the PDUs in a soft buffer or discards them based on a status of a previous transmission. The UE decodes the stored PDUs and performs scheduling for multiple decoded PDUs received from several transmissions. According to a Medium Access Control (MAC) specification, 3GPP TS 25.321 V7.0.0, developed by the 3rd Generation partnership Project (3GPP), a PDU has a transmission sequence number (TSN) for scheduling use, which has a value of 0-63. Moreover, the specification defines a new data indicator (NDI), having a value of 1 or 0, for indicating that a transmission is a new transmission or a retransmission with respect to the previous transmission. Using the NDI, the UE can determine if there is new data included in the PDUs. Every time a new transmission is being established, such as after receiving an ACK from the UE, the UTRAN increments the previous NDI value by one and then sends the updated NDI for the new transmission. On the contrary, when establishing a retransmission, such as receiving a NACK from the UE, the UTRAN uses the same NDI. Thus, if the UE receives NDIs having different values, such as '1', '0' or '0','1', in two consecutive transmissions, the latter transmission is regarded as a new transmission with respect to the former one. The UE then decodes the PDUs of the latter transmission and stores the PDUs in the soft buffer to replace originally existing data. Oppositely, if the UE receives the NDIs having the same values, such as '1', '1' or '0', '0', in the two consecutive transmissions, the latter transmission is regarded as a retransmission with respect to the former one. In such a situation, if the former transmission is known decoded unsuccessfully, the UE performs soft combining on the PDUs of the latter transmission and the data in the soft buffer. Meanwhile, the data in the soft buffer may be the PDUs of the past several transmissions due to unsuccessful decoding. Oppositely, if the former transmission is known decoded successfully, the UE transmits the data in the soft buffer to a scheduling unit and feeds back an ACK. However, the PDUs of the latter transmission are discarded by the UE. If a certain transmission error occurs, such as discontinuous transmission (DTX), the HARQ process may cause the UE to miss useful PDUs, resulting in incomplete collection of data blocks in the upper layer (RLC). One following example explains such an erroneous situation in detail.

Please refer to FIG. 1, which is a schematic diagram of an HARQ process for transmitting packets in HSDPA according to the prior art. In FIG. 1, assume that a UTRAN (network end) prepares four PDUs for a UE and sends corresponding NDIs for each transmission. The TSNs of the PDUs are 8, 12, 18, and 24, respectively. In the beginning, the UTRAN transmits the PDU with NDI=0 and TSN=8. The UE stores the PDU in a soft buffer after receiving and decoding the PDU successfully, and thereby feeds back an ACK to the UTRAN. Due to the ACK reported, the UTRAN then transmits the PDU with NDI=1 and TSN=12 to the UE. Meanwhile, a transmission error occurs such that the PDU is lost during transmission and the UTRAN receives an ACK. However, the UE does not detect the transmission (the PDU with NDI=1 and TSN=12) and does not transmit the ACK, either. In this situation, the UTRAN mistakenly determines that the UE successfully receives the PDU with NDI=1 and TSN=12, and subsequently transmits the PDU with NDI=0 and TSN=18. From the standpoint of the UE, the PDUs with TSN=8 and TSN=18 have the same NDI value, so the PDU with TSN=18 is considered a retransmission of the PDU with TSN=8. According to the foregoing MAC specification, 3GPP TS 25.321 V7.0.0-11.6.2.2, the UE will transfer the data in the soft buffer, which includes the PDU with TSN=8, to the scheduling unit due to successful decoding of the PDU with TSN=8. The PDU with NDI=0 and TSN=18, mistakenly determined to be a retransmission packet, is discarded by the UE. The UE misses the PDU, including new data, such that the upper layer cannot completely collect and reconstruct the data blocks, resulting in radio resource waste.

SUMMARY OF THE INVENTION

It is therefore a primary object of the present invention to provide a method and related communications device for handling packets for a user end in a wireless communications system, enhancing utilization of radio resources.

The present invention discloses a method of handling packets for a user end in a wireless communications system. The method includes the following steps. A hybrid automatic repeat request (HARQ) procedure is activated. A first packet is received and decoded successfully. A second packet following the first packet is received. The second packet is then decoded if the second packet is a retransmission of the first packet.

The present invention further discloses a communications device for properly handling packets to enhance utilization of radio resources in a wireless communications system. The communications device includes a control circuit, a processor and a memory. The control circuit is used for realizing functions of the communications device. The processor is installed in the control circuit and used for executing a program code to command the control circuit. The memory is installed in the control circuit and coupled to the processor, and used for storing the program code. The program code includes: activating a hybrid automatic repeat request (HARQ) procedure, receiving a first packet and decoding the first packet successfully, receiving a second packet following the first packet, and decoding the second packet if the second packet is a retransmission of the first packet. These and other objectives of the present invention will no doubt become obvious to those of ordinary skill in the art after reading the following detailed description of the preferred embodiment that is illustrated in the various figures and drawings.

DETAILED DESCRIPTION

Figure 2:
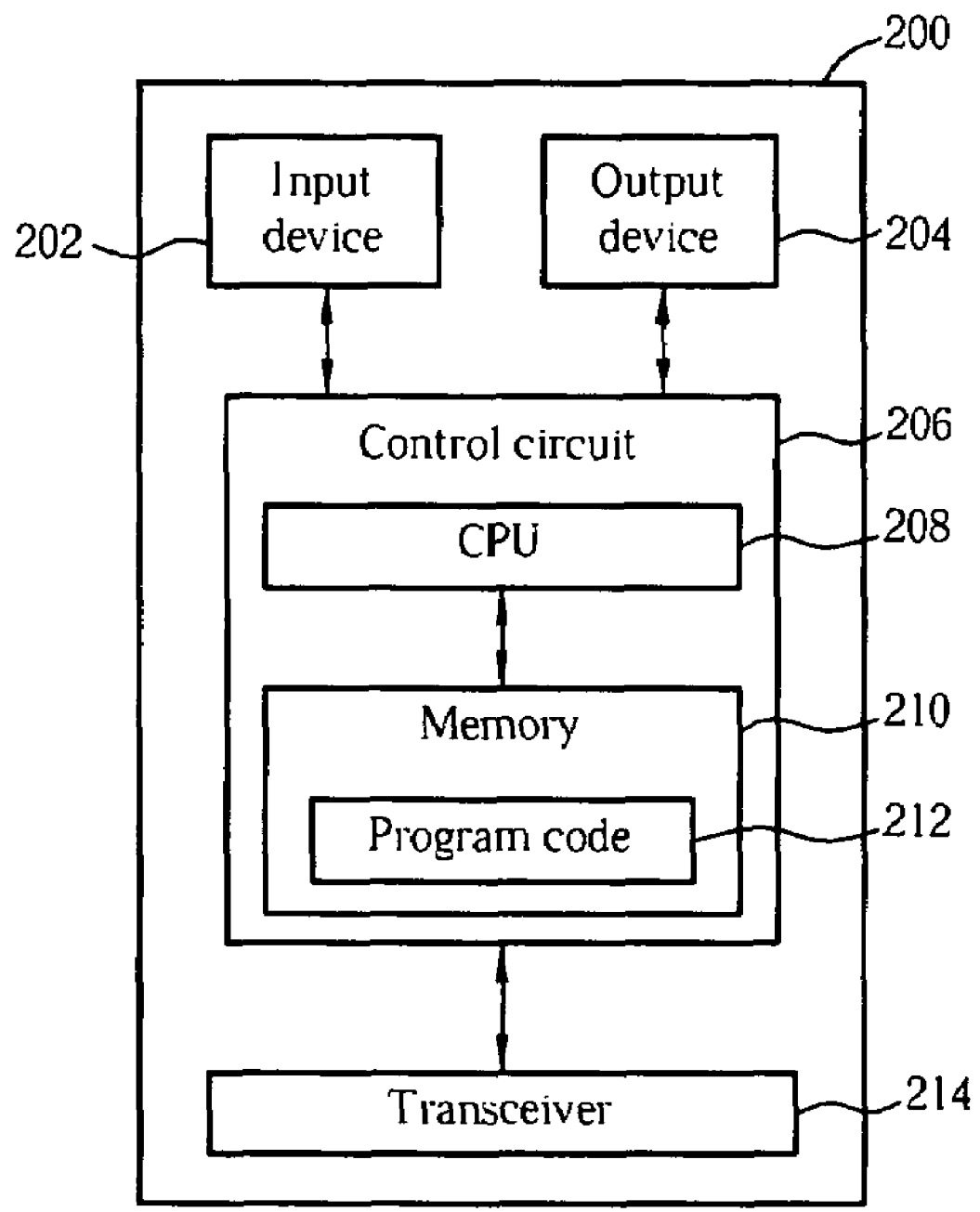
FIG. 2 is a function block diagram of a wireless communications device.
Figure 3:
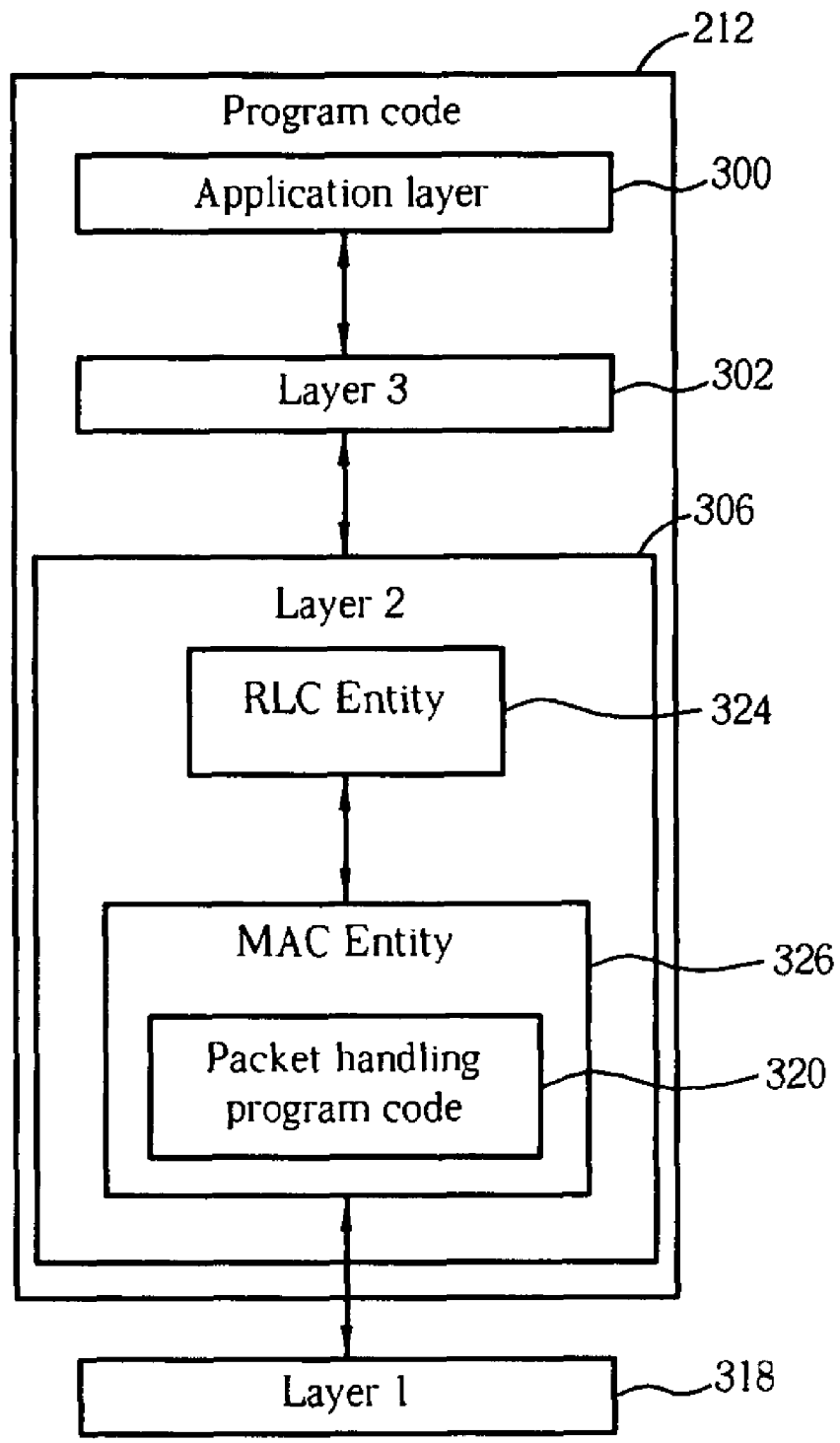
FIG. 3 is a diagram of program code of FIG. 1.

Please refer to FIG. 2, which is a functional block diagram of a communications device 200. For the sake of brevity, FIG. 2 only shows an input device 202, an output device 204, a control circuit 206, a central processing unit (CPU) 208, a memory 210, a program code 212, and a transceiver 214 of the communications device 200. In the communications device 200, the control circuit 206 executes the program code 212 in the memory 210 through the CPU 208, thereby controlling operation of the communications device 200. The communications device 200 can receive signals input by a user through the input device 202, such as a keyboard, and can output images and sounds through the output device 204, such as a monitor or speakers. The transceiver 214 is used to receive and transmit wireless signals, delivering received signals to the control circuit 206, and outputting signals generated by the control circuit 206 wirelessly. From a perspective of a communications protocol framework, the transceiver 214 can be seen as a portion of Layer 1, and the control circuit 206 can be utilized to realize functions of Layer 2 and Layer 3. Please continue to refer to FIG. 3, which is a diagram of the program code 212 shown in FIG. 2. The program code 212 includes an application layer 300, a Layer 3 302, and a Layer 2 306, and is coupled to a Layer 1 318. The Layer 2 306 comprises two sub-layers: a radio link control (RLC) entity 324 and a media access control (MAC) entity 326. The MAC entity 326 can match packets received from different logic channels of the RLC entity 324 to common, shared, or dedicated transport channels according to radio resource allocation commands of the Layer 3 (RRC layer) 302, for performing channel mapping, multiplexing, transport format selection, or random access control.

Figure 4:
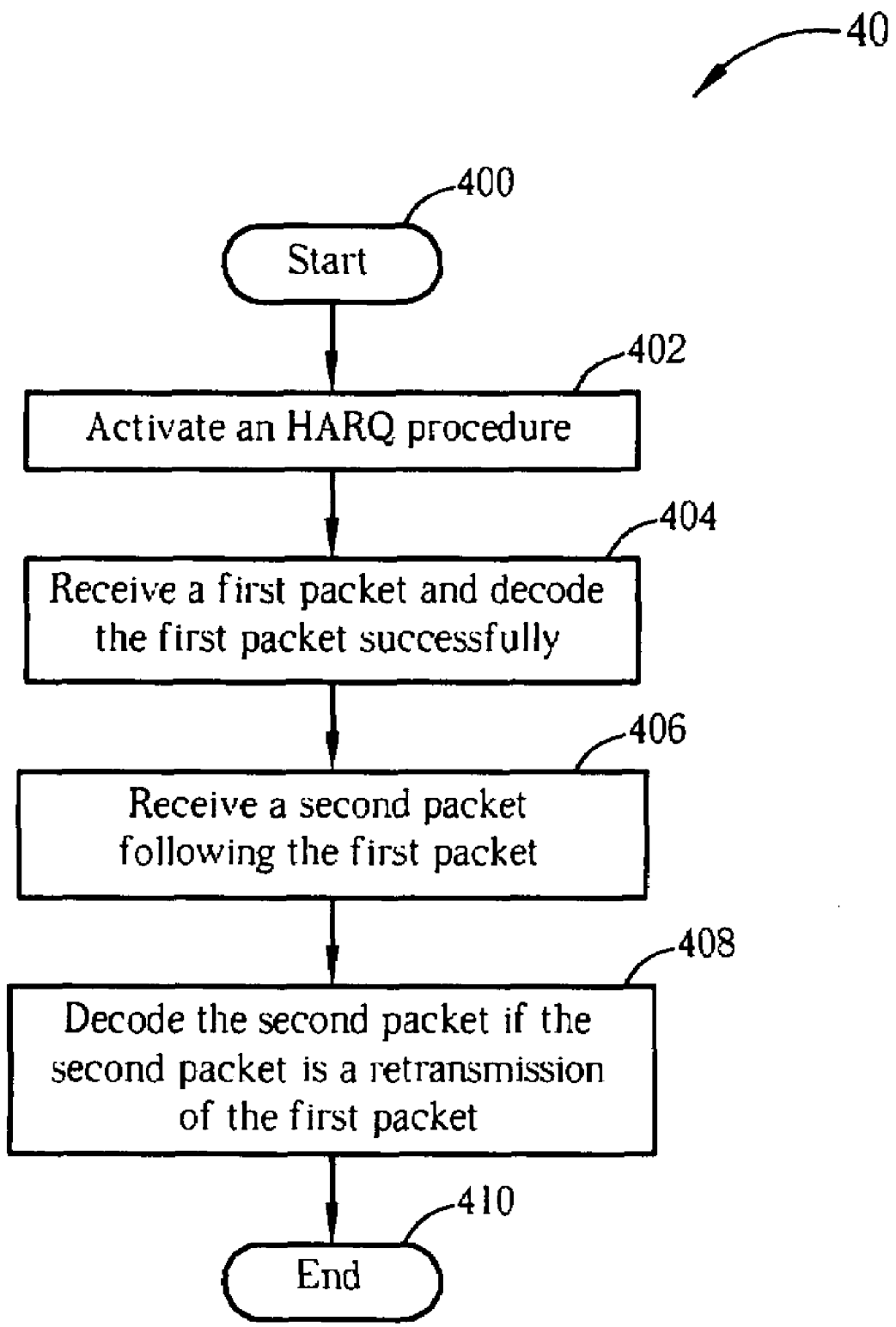
FIG. 4 is a flowchart of a process according to an embodiment of the present invention.

Preferably, the communications device 200 is applied to a high-speed downlink packet access system (HSDPA) of a third generation (3G) mobile communications system, and utilizes the program code 212 to execute the HARQ process. Therefore, the present invention provides a packet handling program code 320 for properly handling packets to enhance radio resource utility. Please refer to FIG. 4, which is a schematic diagram of a process 40 according to an embodiment of the present invention. The process 40 can be compiled into the packet handling program code 320 and thereby includes the following steps:

Step 400: Start.
Step 402: Activate a hybrid automatic repeat request (HARQ) procedure.
Step 404: Receive a first packet and decode the first packet successfully.
Step 406: Receive a second packet following the first packet.
Step 408: Decode the second packet if the second packet is a retransmission of the first packet.
Step 410: End.

According to the process 40, the UE receives the first and second packets from two consecutive transmissions after the HARQ process is activated. The first packet is decoded successfully and thereby stored in a buffer. It is then determined whether or not the second packet is the retransmission of the first packet. If so, the second packet is decoded. In the HSDPA of the third generation (3G) mobile communications system, every time the UTRAN establishes a transmission to transmit packets to the UE, a corresponding new data indicator (NDI) is sent simultaneously to notify the UE that this transmission is the retransmission of a previous transmission. Thus, if the NDI value of the second packet is identical to that of the first packet, the second packet is regarded as the retransmission of the first packet, and thereby the UE decodes the second packet. In other words, in two consecutive transmissions, if the UE determines the latter is the retransmission of the former, and the former is decoded successfully, packets received from the latter transmission should be decoded, but not discarded. In addition, for requirements of different systems, the UE generates an ACK regardless of whether the second packet is decoded successfully or not. Alternatively, the UE generates a NACK for a retransmission if the second packet is decoded unsuccessfully.

Figure 1:
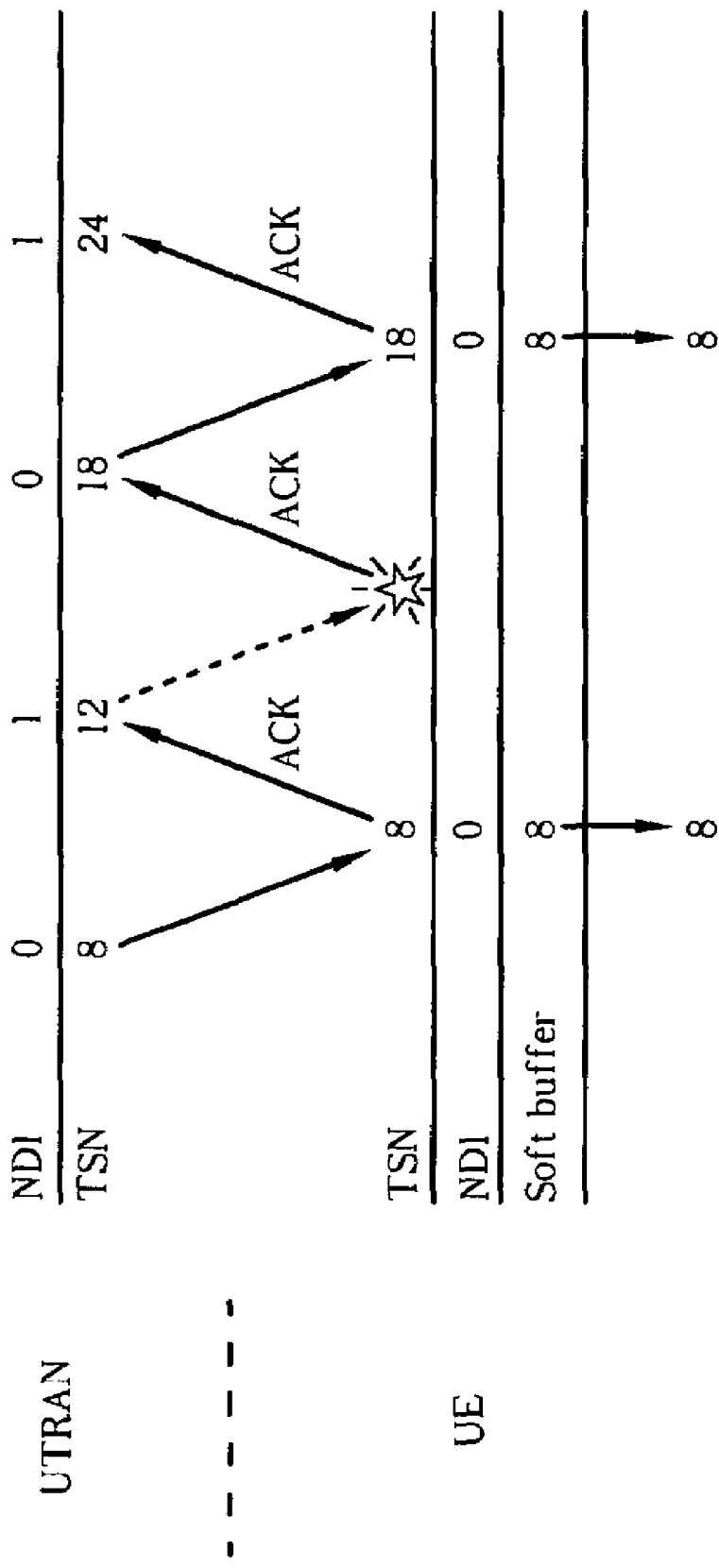
FIG. 1 is a schematic diagram of an HARQ process for transmitting packets in HSDPA according to the prior art.
Figure 5:
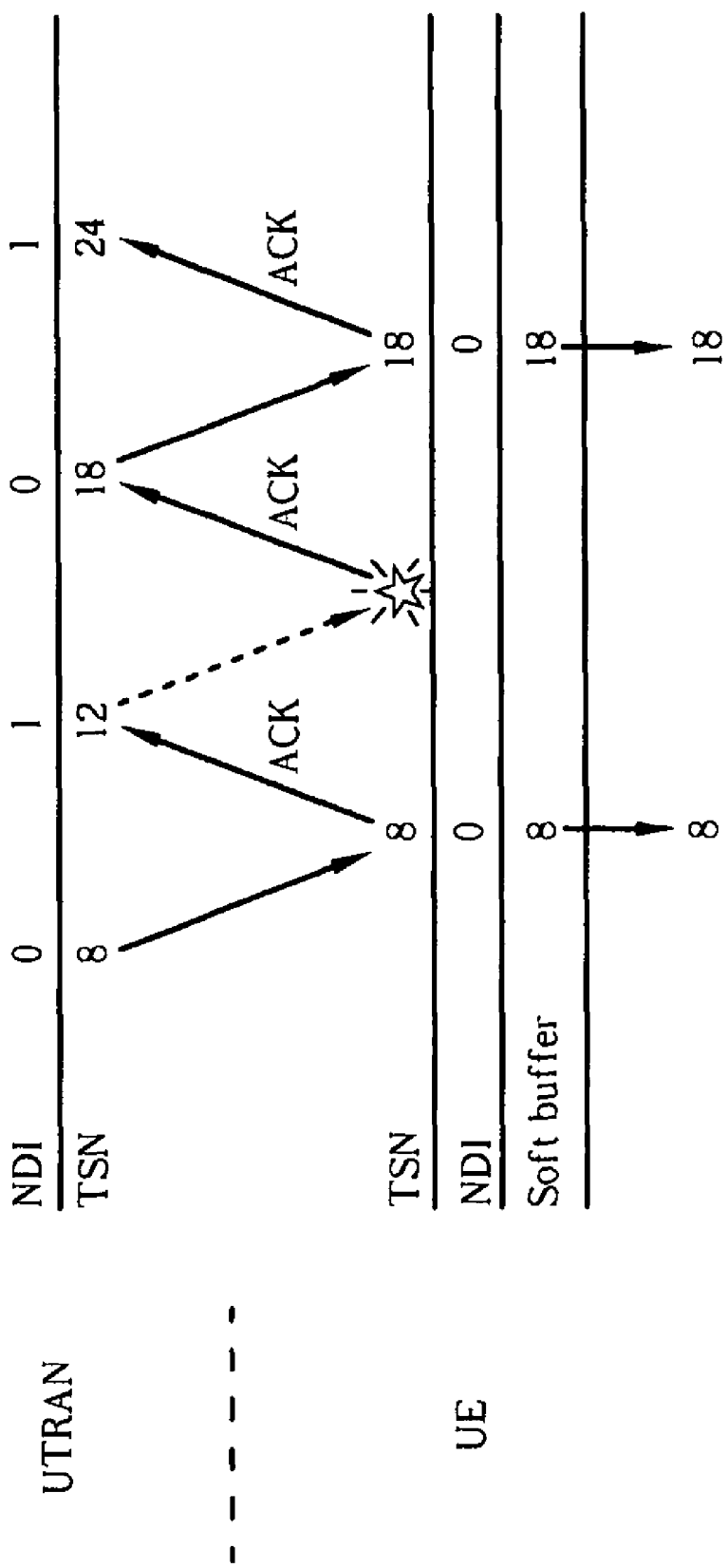
FIG. 5 is a schematic diagram of an HARQ process for transmitting packets in HSDPA according to an embodiment of the present invention.

Please refer to FIG. 5, which is a schematic diagram of an HARQ process for transmitting packets in HSDPA according to an embodiment of the prevent invention. In FIG. 5, the contents transmitted between the UTRAN and the UE are similar to those in FIG. 1. A difference between FIG. 1 and FIG. 5 is described as follows. According to the process 40, although the UE determines that the PDU with NDI=0 and TSN=18 is the retransmission of the PDU with NDI=0 and TSN=8 and, moreover, the PDU with NDI=0 and TSN=8 is known decoded successfully, the UE still decodes the PDU with NDI=0 and TSN=18 instead of discarding it. In this situation, even if a transmission error such as that shown in FIG. 1 occurs, the UE will not miss the chance to receive new data included in the PDU with NDI=0 and TSN=18. This enhances radio resource utilization and allows the upper layer to collect the data back more completely.

Through the embodiment of the present invention, even if a new packet is misinterpreted as a retransmission of the previous transmission, the new packet is decoded, but not discarded. Therefore, if the above-mentioned transmission error occurs, the present invention can receive new packets successfully, increasing the probability of successful transmission, and enhancing radio resource utilization.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling packets for a user end in a wireless communications system, comprising:
   activating a hybrid automatic repeat request (HARQ) procedure;
   receiving a first packet from a transmitter and decoding the first packet successfully;
   sending an acknowledgement (ACK) to the transmitter, the transmitter successfully receiving the ACK;
   not detecting a second packet transmitted by the transmitter but an ACK is detected falsely by the transmitter indicating that the second packet was successfully received;
   receiving a third packet from the transmitter following the first packet, the third packet being a new packet;
   determining that the third packet is a retransmission of the first packet; and
   decoding the third packet.

2. The method of claim 1 further comprising sending an acknowledgement (ACK) after the decoding of the third packet is performed.

3. The method of claim 1 further comprising sending a negative acknowledgement (NACK) if the third packet is decoded unsuccessfully.

4. The method of claim 1, wherein the wireless communications system is a high-speed downlink packet access (HSDPA) system of a third generation wireless communications system.

5. The method of claim 4, wherein the third packet has a new data indicator (NDI) value which is identical to a new data indicator value of the first packet when the third packet is determined as the retransmission of the first packet.

6. A communications device for properly handling packets to enhance utilization of radio resources in a wireless communications system, the communications device comprising:
   a control circuit for realizing functions of the communications device;
   a processor installed in the control circuit, for executing a program code to command the control circuit; and
   a memory installed in the control circuit and coupled to the processor for storing the program code;
   wherein the program code comprises:
      activating a hybrid automatic repeat request (HARQ) procedure;
      receiving a first packet from a transmitter and decoding the first packet successfully;
      sending an acknowledgement (ACK) to the transmitter, the transmitter successfully receiving the ACK;
      not detecting a second packet transmitted by the transmitter but an ACK is detected falsely by the transmitter indicating that the second packet was successfully received;
      receiving a third packet from the transmitter following the first packet, the third packet being a new packet;
      determining that the third packet is a retransmission of the first packet; and
      decoding the third packet.

7. The communications device of claim 6, wherein the program code further comprises sending an acknowledgement (ACK) after the decoding of the third packet is performed.

8. The communications device of claim 6, wherein the program code further comprises sending a negative acknowledgement (NACK) if the third packet is decoded unsuccessfully.

9. The communications device of claim 6, wherein the wireless communications system is a high-speed downlink packet access (HSDPA) system of a third generation wireless communications system.

10. The communications device of claim 9, wherein the third packet has a new data indicator (NDI) value which is identical to a new data indicator value of the first packet when the third packet is determined as the retransmission of the first packet.

11. A method of handling packets for a user end in a wireless communications system, comprising:
   activating a hybrid automatic repeat request (HARQ) procedure;
   receiving a first packet and decoding the first packet successfully, the first packet having a new data indicator (NDI) indicating that the packet includes new data;
   not detecting a second packet transmitted by the transmitter but an ACK is detected falsely by the transmitter indicating that the second packet was successfully received;
   receiving a third packet following the first packet, the third packet being a new packet and having the same NDI as the NDI of the first packet;
   determining that the third packet is a retransmission of the first packet based on NDI of the third packet being the same value as the NDI of the first packet; and
   decoding the third packet.

* * * * *